R. E. O'NEIL.
AUTOMOBILE BRACING ATTACHMENT.
APPLICATION FILED AUG. 13, 1917.
1,288,972.
Patented Dec. 24, 1918.
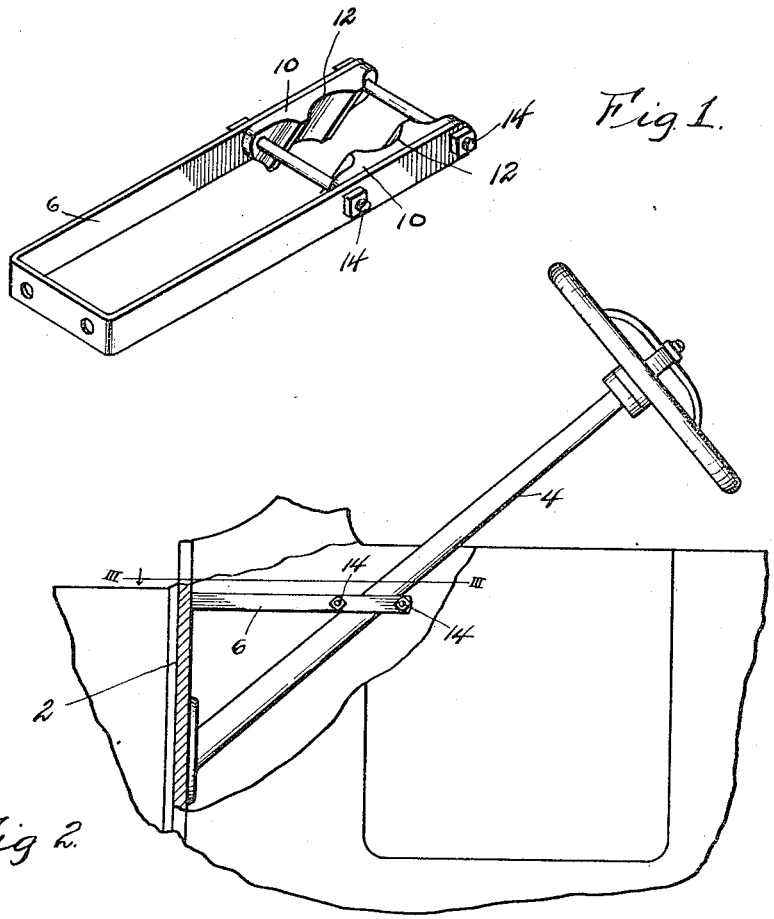
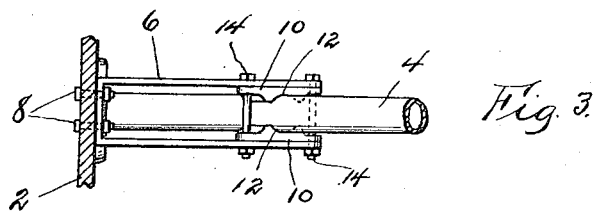
WITNESS:
INVENTOR.
Robt. E. O'Neil,
BY
ATTORNEY

UNITED STATES PATENT OFFICE.

ROBERT E. O'NEIL, OF KANSAS CITY, MISSOURI.

AUTOMOBILE-BRACING ATTACHMENT.

1,288,972.

Specification of Letters Patent.

Patented Dec. 24, 1918.

Application filed August 13, 1917. Serial No. 185,885.

*To all whom it may concern:*

Be it known that I, ROBERT E. O'NEIL, a citizen of the United States, residing at Kansas City, in the county of Jackson, State of Missouri, have invented certain new and useful Improvements in Automobile-Bracing Attachments, of which the following is a full and exact specification.

The present invention relates to bracing means for automobile structures, and one of the objects in view is to provide a novel form of attachment adapted to form an efficient bracing and steadying device for the steering column of the automobile.

To this end the device comprises a brace member adapted to be secured to the dashboard of the automobile, and provided with means for securely and detachably clamping the steering column in such a manner as to aid in supporting said column and also serve to rigidly brace and steady the same.

It is also sought to devise a simple, strong and durable attachment which may be cheaply manufactured and quickly and conveniently applied to automobile structures for which it is adapted and without requiring any other changes in the construction of the automobile.

With the foregoing objects in view, the invention will now be described with reference to the accompanying drawing illustrating one form of construction which has been devised for embodying the proposed improvements, after which those features deemed to be novel will be set forth and defined in the appended claims.

In the drawing—

Figure 1 is a perspective view of a brace attachment constructed in accordance with the present invention, and detached from its bracing position;

Fig. 2 is a vertical sectional view of a portion of an automobile structure, showing the relation in which the attachment is designed to be installed; and Fig. 3 is a horizontal section taken on the line III—III of Fig. 2.

Referring to the said drawing in detail, this illustrates a portion of an automobile structure, having the dash-board 2 and the steering column 4 extending upwardly and rearwardly from the dash-board in such a relation that the said dash-board serves as a partial support or steadying means for the steering column. As thus constructed it is found in practice that the steering column (which is constantly subjected to such severe strains during the operation of driving the automobile) is not afforded a sufficiently steady and fixed support, and the present invention accordingly aims to provide a simple attachment adapted to be installed in position for exerting an additional bracing and supporting action upon the steering column 4. For this purpose a U-shaped bracket or bracing member 6 is provided which is secured by means of bolts 8 or the like to the dash-board 2 near its upper margin and substantially in line with the steering column 4. The opposite sides or leg portions of said bracket 6 are of such length that the same extend upon the opposite sides of the steering column where said leg portions are provided with a pair of clamping plates 10. The plates 10 are shaped to conform to the opposite sides of the steering column, the inner faces of said plates 10 having the curved and inclined recesses or notches 12 for fitting the opposite sides of said column and accommodating the relative angular positions of said column and plates. The plates 10 and the ends of the bracket 6 are securely clamped in this relation to the opposite sides of the steering column by means of bolts 14 passing through the leg portions of said bracket and the ends of said clamping plates 10, thereby serving to detachably secure the parts in the relation illustrated in Figs. 2 and 3. In this position the attachment acts to securely and rigidly brace and steady the steering column, and the arrangement of the recessed clamping plates 10 to fit the sides of the steering column, which is of oval cross-section, operates also to effectively prevent any turning tendency of the steering column.

It will thus be apparent that a simple and efficient form of attachment is provided for carrying out the purposes of the invention. The device is inexpensive and can be quickly and conveniently applied in the position shown on automobiles without requiring any alteration in the rest of the construction, and when installed it acts to firmly brace and steady the steering column and hold the same in its proper fixed and rigid position.

While the foregoing represents what is now deemed to constitute the preferred form of construction for the attachment, the right is reserved to all such formal changes or modifications as may fairly fall within the scope of the appended claims.

What I claim is:

1. The combination with the dash-board and steering column of an automobile, of a rigid U-shaped brace member secured to said dash-board and having the leg portions of said member extending in proximity with the opposite sides of said steering column, a clamping plate interposed between each of the ends of said leg portions and said steering column, the inner faces of said clamping plates being shaped to conform to said opposite sides of the steering column, and bolts extending through said leg portions and the ends of said clamping plates at the front and rear, respectively, of said column for detachably clamping said plates and leg portions of the brace member to said steering column.

2. The combination with the dash-board and inclined steering column of an automobile, of a rigid U-shaped brace member secured to said dash-board and having the leg portions of said member extending substantially horizontally rearward into proximity with the opposite sides of said steering column, a clamping plate interposed between the end of each of said leg portions and the adjacent side of the steering column, the inner faces of said clamping plates being formed with oppositely arranged curved and inclined recesses shaped to conform to the inclined side surfaces of said steering column, and bolts extending through said leg portions and the ends of said clamping plates at the front and rear, respectively, of said column, for detachably clamping said plates and leg portions of the brace member to said steering column.

In testimony whereof I hereto affix my signature.

ROBT. E. O'NEIL.

Copies of this patent may be obtained for five cents each, by addressing the "Commissioner of Patents, Washington, D. C."